(12) United States Patent
Yokokawa et al.

(10) Patent No.: US 10,899,407 B2
(45) Date of Patent: Jan. 26, 2021

(54) SADDLE RIDING VEHICLE

(71) Applicant: HONDA MOTOR CO., LTD., Tokyo (JP)

(72) Inventors: Shunji Yokokawa, Wako (JP); Rui Maeda, Wako (JP); Kie Hamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 36 days.

(21) Appl. No.: 16/358,805

(22) Filed: Mar. 20, 2019

(65) Prior Publication Data

US 2019/0300090 A1 Oct. 3, 2019

(30) Foreign Application Priority Data

Mar. 30, 2018 (JP) .................................. 2018-069550

(51) Int. Cl.
| B62J 17/02 | (2006.01) |
| B62J 17/10 | (2020.01) |
| B62M 7/02 | (2006.01) |

(52) U.S. Cl.
CPC ............... *B62J 17/02* (2013.01); *B62J 17/10* (2020.02); *B62M 7/02* (2013.01)

(58) Field of Classification Search
CPC ............... B62J 17/10; B62J 17/00; B62J 7/02
USPC ........................................................ 296/78.1
See application file for complete search history.

(56) References Cited

U.S. PATENT DOCUMENTS

| 4,887,688 A | 12/1989 | Horiike et al. |
| 8,936,123 B2 * | 1/2015 | Kogo ................ B60Q 1/0433 |
| | | 180/219 |
| 2013/0057016 A1* | 3/2013 | Yamada ............... B62J 17/02 |
| | | 296/78.1 |
| 2014/0202782 A1* | 7/2014 | Tsukui ................ B62J 17/00 |
| | | 180/68.1 |

(Continued)

FOREIGN PATENT DOCUMENTS

| CN | 101081632 | 12/2007 |
| CN | 102975798 | 3/2013 |

(Continued)

OTHER PUBLICATIONS

Extended European Search Report for European Patent Application No. 19165447.4 dated Aug. 22, 2019.

(Continued)

*Primary Examiner* — Jason S Morrow
(74) *Attorney, Agent, or Firm* — Amin, Turocy & Watson, LLP

(57) ABSTRACT

Provided is a motorcycle including side cowls configured to cover a part of a vehicle body frame from sides, wherein each of the side cowls includes: an inner cowl, an outer cowl configured to cover the inner cowl from an outside in a vehicle width direction to form an air guide path configured to guide traveling air from a front side to a rear side between the inner cowl and the outer cowl, and an air flow conditioning member configured to generate downforce using traveling air directed from the inner cowl to an inner surface of the outer cowl in the vehicle width direction and flowing through the air guide path, and the air flow conditioning member is separated from the inner surface of the outer cowl in the vehicle width direction.

12 Claims, 14 Drawing Sheets

(56) References Cited

U.S. PATENT DOCUMENTS

| | | | |
|---|---|---|---|
| 2014/0225398 A1 | 8/2014 | Mikura et al. | |
| 2016/0016623 A1* | 1/2016 | Ishii | B62D 35/008 180/229 |
| 2019/0329833 A1* | 10/2019 | Miki | B62M 7/02 |

FOREIGN PATENT DOCUMENTS

| | | |
|---|---|---|
| CN | 104554536 | 4/2015 |
| EP | 2792586 | 10/2014 |
| EP | 2889207 | 7/2015 |
| JP | 59-091982 | 6/1984 |
| JP | 2004-276722 | 10/2004 |
| JP | 2010-162990 | 7/2010 |
| JP | 2010-228719 | 10/2010 |
| JP | 2011-031705 | 2/2011 |
| JP | 2012-162094 | 8/2012 |
| JP | 2012-218539 | 11/2012 |
| JP | 2013-052831 | 3/2013 |
| JP | 102975798 | 3/2013 |
| JP | 104554536 | 4/2015 |
| JP | 2015-096415 | 5/2015 |
| JP | 2018-111414 | 7/2018 |
| WO | 2015/071934 | 5/2015 |
| WO | 2015/015609 | 3/2017 |

OTHER PUBLICATIONS

Japanese Office Action for Japanese Patent Application No. 2018-069550 dated Oct. 23, 2019.
Chinese Office Action for Chinese Patent Application No. 201910219769.5 dated Jun. 2, 2020.

\* cited by examiner

SADDLE RIDING VEHICLE

CROSS-REFERENCE TO RELATED APPLICATION

Priority is claimed on Japanese Patent Application No. 2018-069550, filed Mar. 30, 2018, the content of which is incorporated herein by reference.

BACKGROUND OF THE INVENTION

Field of the Invention

The present invention relates to a saddle riding vehicle.

Description of Related Art

In the related art, in a saddle riding vehicle, a structure configured to apply downforce to a vehicle body is known.

For example, Japanese Unexamined Patent Application, First Publication No. 2015-96415 discloses a structure configured to generate downforce by guiding traveling air flowing rearward along an upper surface of a front cowl to an aerodynamic force generating unit disposed over the upper surface of the front cowl. A mirror housing configured to hold a mirror is provided on a tip portion of the aerodynamic force generating unit.

SUMMARY OF THE INVENTION

However, since downforce generated by an aerodynamic force generating unit provided above a vehicle exerts a large influence on the entire vehicle, steering (turning) of a front wheel tends to be difficult.

An aspect of the present invention is directed to providing a saddle riding vehicle including a side cowl configured to cover at least a part of a vehicle body from a side, and in which both generation of downforce and steerability are easily realized.

(1) A saddle riding vehicle according to an aspect of the present invention includes side cowls configured to cover at least a part of a vehicle body from sides, wherein each of the side cowls includes an inner cowl; an outer cowl configured to cover the inner cowl from an outside in a vehicle width direction to form an air guide path configured to guide traveling air from a front side to a rear side between the inner cowl and the outer cowl; and an air flow conditioning member configured to generate downforce using traveling air directed from the inner cowl to an inner surface of the outer cowl in the vehicle width direction and flowing through the air guide path, and the air flow conditioning member is separated away from the inner surface of the outer cowl in the vehicle width direction.

(2) In the aspect of (1), a communication space configured to communicate with the outside in the vehicle width direction of the air flow conditioning member in an upward/downward direction may be formed between the inner cowl and the outer cowl.

(3) In the aspect of (1) or (2), a front edge of the air flow conditioning member may be inclined so as to be disposed forward as it goes inward in the vehicle width direction.

(4) In the aspect of any one of (1) to (3), an outer end portion of the air flow conditioning member in the vehicle width direction may have a concave section recessed inward in the vehicle width direction.

(5) In the aspect of any one of (1) to (4), an outer end portion of the air flow conditioning member in the vehicle width direction may have a plane facing the inner surface of the outer cowl in the vehicle width direction.

(6) In the aspect of any one of (1) to (5), a plurality of air flow conditioning members may be provided at intervals in the upward/downward direction, and a connecting member configured to connect inner ends of the plurality of air flow conditioning members in the vehicle width direction may be further provided.

(7) In the aspect of (6), the plurality of air flow conditioning members and the connecting member may be formed integrally with the same member.

(8) In the aspect of any one of (1) to (7), a through-hole that opens in the vehicle width direction and through which the air flow conditioning member is able to pass may be formed in the inner cowl, and the air flow conditioning members may be attached to an inner surface of the inner cowl in the vehicle width direction so as to be directed toward the inner surface of the outer cowl in the vehicle width direction through the through-hole.

(9) In the aspect of any one of (1) to (8), the plurality of air flow conditioning members may be provided at intervals in the upward/downward direction, the plurality of air flow conditioning members may include a first air flow conditioning member and a second air flow conditioning member disposed below the first air flow conditioning member, and the first air flow conditioning member may be larger than the second air flow conditioning member.

(10) In the aspect of any one of (1) to (9), the plurality of air flow conditioning members may be provided at intervals in the upward/downward direction, the plurality of air flow conditioning members may include a first air flow conditioning member and a second air flow conditioning member disposed below the first air flow conditioning member, and a closing section configured to close a space below the second air flow conditioning member from a front side may be formed in the side cowl.

(11) In the aspect of (9) or (10), an upper surface of the second air flow conditioning member may extend to be inclined so as to be disposed upward as it goes rearward when seen in a side view.

(12) In the aspect of any one of (9) to (11), a front fender configured to cover a front wheel from above may be further provided, the front fender may include a fork cover section configured to cover at least a part of a front fork at least from one of a front side and a lateral side, and the fork cover section may be disposed below a front end of an upper surface of the second air flow conditioning member.

(13) In the aspect of any one of (1) to (12), a handle grip that is able to be gripped by an occupant may be further provided, an upper surface of the air flow conditioning member may extend to be inclined so as to be disposed upward as it goes rearward when seen in a side view, and an outer end of the handle grip in the vehicle width direction may be disposed above an extension line of the upper surface of the air flow conditioning member when seen in a side view.

According to the aspect of (1), since the side cowl includes the air flow conditioning member configured to generate downforce using traveling air directed from the inner cowl to the inner surface of the outer cowl in the vehicle width direction and flowing through the air guide path, the following effects are exhibited. In comparison with the structure in which downforce is generated using an aerodynamic force generating unit disposed above the upper surface of the front cowl, an influence of the downforce applied to an upper side of the vehicle can be reduced. In addition, since the air flow conditioning member is separated from the inner surface of the outer cowl in the vehicle width direction, the following effects are exhibited. Since the traveling air is separated from the air flow conditioning member at the outer end portion of the air flow conditioning member in the vehicle width direction while generating downforce by receiving the traveling air using the air flow conditioning member, appropriate steerability can be obtained. Accordingly, both generation of downforce and steerability are easily realized.

According to the aspect of (2), since the communication space that communicates with the outer side in the vehicle width direction of the air flow conditioning member in the upward/downward direction is formed between the inner cowl and the outer cowl, the following effects are exhibited. Since the traveling air that has generated the downforce can join traveling air in another space through the communication space outside the air flow conditioning member in the vehicle width direction while appropriately generating the downforce by receiving the traveling air in the inner portion of the air flow conditioning member in the vehicle width direction, the downforce can be appropriately suppressed, and steerability can be improved. In addition, generation of downforce and adjustment of steerability can be easily performed by adjusting a size of the communication space.

According to the aspect of (3), since the front edge of the air flow conditioning member is inclined so as to be disposed forward as it goes inward in the vehicle width direction, the following effects are exhibited. Since the traveling air flowing from the inside in the vehicle width direction can be more easily received first at the inner portion of the air flow conditioning member in the vehicle width direction and then a flow of the traveling air to the outside in the vehicle width direction is easily formed, both generation of downforce and steerability are easily realized.

According to the aspect of (4), since sink marks (dents) that form on a surface of the air flow conditioning member due to volume contraction by cooling during resin molding because the outer end portion of the air flow conditioning member in the vehicle width direction has the concave section recessed inward in the vehicle width direction are suppressed, the surface of the air flow conditioning member easily becomes a smooth surface, and the traveling air can be effectively guided.

According to the aspect of (5), since the communication space can be easily formed between the outer portion of the air flow conditioning member in the vehicle width direction and the inner surface of the outer cowl in the vehicle width direction because the outer end portion of the air flow conditioning member in the vehicle width direction has the plane facing the inner surface of the outer cowl in the vehicle width direction, both generation of downforce and steerability are easily realized.

According to the aspect of (6), since the plurality of air flow conditioning members are provided at intervals in the upward/downward direction and the connecting member configured to connect the inner ends of the plurality of air flow conditioning members in the vehicle width direction is further provided, the following effects are exhibited. Since attachment of the plurality of air flow conditioning members can be simultaneously performed by simply attaching the connecting member to a predetermined portion (the inner cowl), attachment man-hours can be reduced. In addition, in comparison with the case in which the air flow conditioning members are individually attached, attachment position accuracy of the air flow conditioning members can be improved.

According to the aspect of (7), since the plurality of air flow conditioning members and the connecting member can be simultaneously formed as the plurality of air flow conditioning members and the connecting members are formed integrally with the same member, molding man-hours can be reduced.

According to the aspect of (8), since the through-hole that opens in the vehicle width direction and through which the air flow conditioning member can pass is formed in the inner cowl and the air flow conditioning member is attached to the inner surface of the inner cowl in the vehicle width direction so as to be directed toward the inner surface of the outer cowl in the vehicle width direction through the through-hole, the following effects are exhibited. In comparison with the case in which the air flow conditioning member is attached to the outer surface of the inner cowl in the vehicle width direction, the portion of the air flow conditioning member facing the air guide path in the inner portion in the vehicle width direction (the base end portion of the air flow conditioning member in the air guide path) can function as a portion generating downforce. In addition, occurrence of a step section for attachment or the like on the outer surface of the inner cowl in the vehicle width direction can be avoided.

According to the aspect of (9), since the plurality of air flow conditioning members are provided at intervals in the upward/downward direction, the plurality of air flow conditioning members include the first air flow conditioning member and the second air flow conditioning member disposed below the first air flow conditioning member, and the first air flow conditioning member is larger than the second air flow conditioning member, the following effects are exhibited. In the first air flow conditioning member that is larger than the second air flow conditioning member, since the traveling air flowing from the front side of the vehicle is easily caught, the downforce can be effectively generated. In addition, in the second air flow conditioning member that is smaller than and provided below the first air flow conditioning member, since the traveling air flowing from the vicinity of the front wheel disposed below cannot be easily caught, steering of the front wheel can be easily performed.

According to the aspect of (10), since the plurality of air flow conditioning members are provided at intervals in the upward/downward direction, the plurality of air flow conditioning members include the first air flow conditioning member and the second air flow conditioning member disposed below the first air flow conditioning member, and the closing section configured to close the space below the second air flow conditioning member from the front side is provided in the side cowl, the following effects are exhibited. Since the closing section makes it difficult for the second air flow conditioning member to catch the traveling air flowing from the vicinity of the front wheel disposed therebelow, steering of the front wheel can be easily performed.

According to the aspect of (11), since the upper surface of the second air flow conditioning member extends to be inclined so as to be disposed upward as it goes rearward when seen in a side view, the following effects are exhibited. The traveling air flowing from the front side or the upper side of the vehicle easily hits the upper surface of the second air flow conditioning member, and downforce can be obtained such as like a canard.

According to the aspect of (12), since the front fender configured to cover the front wheel from above is further provided, the front fender includes the fork cover section configured to cover at least a part of the front fork at least from one of a front side and a lateral side, and the fork cover section is disposed below the front end of the upper surface of the second air flow conditioning member, the following effects are exhibited. Since the traveling air flow conditioned by the fork cover section cannot be easily caught by the second air flow conditioning member, steering of the front wheel can be easily performed.

According to the aspect of (13), since the handle grip that can be gripped by an occupant is further provided, the upper surface of the air flow conditioning member extends to be inclined so as to be disposed upward as it goes rearward when seen in a side view, and the outer end of the handle grip in the vehicle width direction is disposed above the extension line of the upper surface of the air flow conditioning member when seen in a side view, the following effects are exhibited. Since occurrence of resistance due to the traveling air that flows along the upper surface of the air flow conditioning member hitting an occupant's (a rider's) arms can be suppressed, it is possible to suppress inhibition of a downforce effect of the air flow conditioning member.

DETAILED DESCRIPTION OF THE INVENTION

Figure 1:
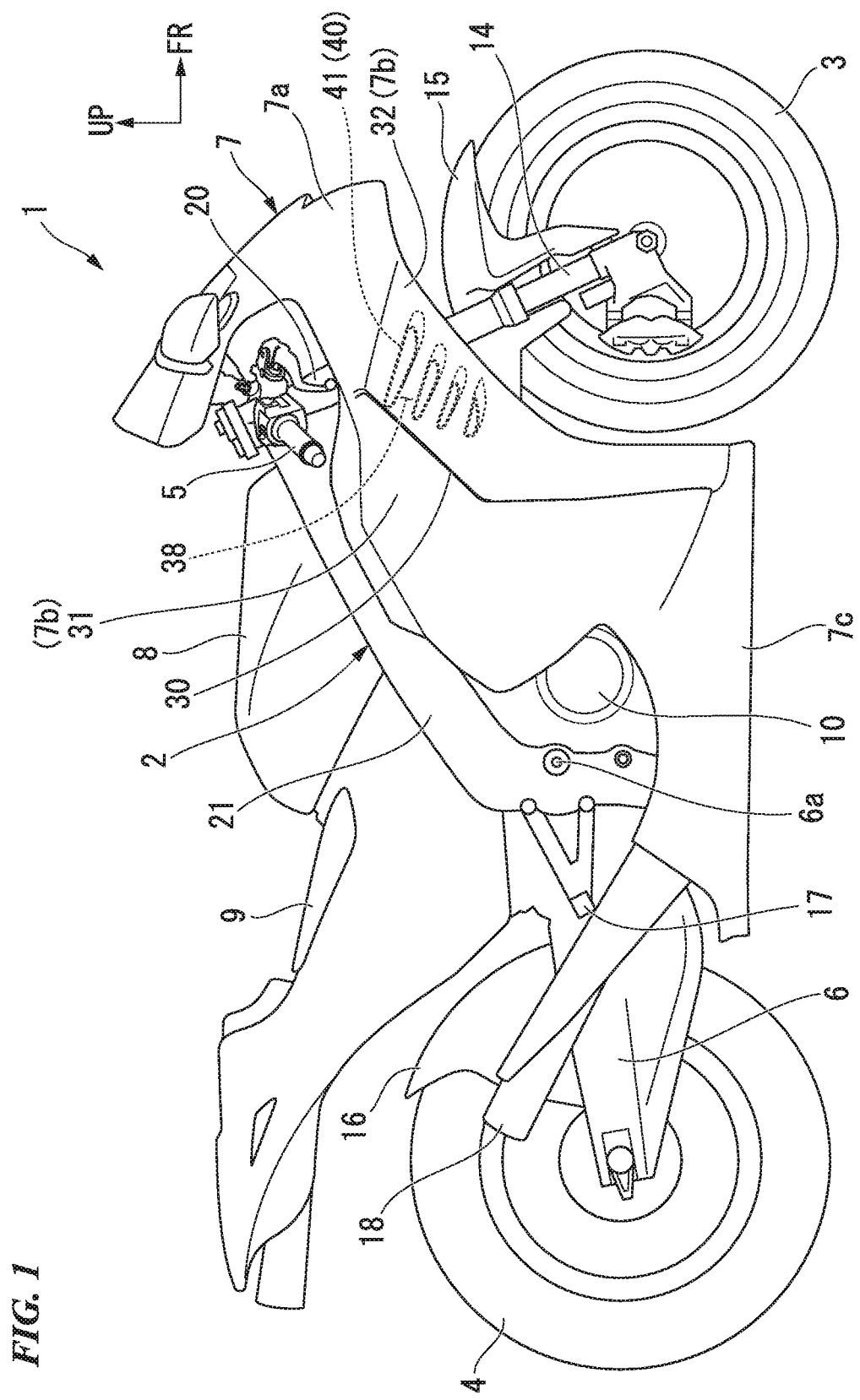
FIG. 1 is a right side view of a motorcycle according to an embodiment.

Hereinafter, an embodiment of the present invention will be described with reference to the accompanying drawings. Further, directions of forward, rearward, leftward, rightward, and so on, in the following description are the same as directions in a vehicle described below unless the context clearly indicates otherwise. In addition, in appropriate places in the drawings used in the following description, an arrow FR indicates a forward direction with respect to a vehicle, an arrow LH indicates a leftward direction with respect to the vehicle, and an arrow UP indicates an upward direction with respect to the vehicle.

<Entire Vehicle>

FIG. 1 shows a motorcycle 1 that is an example of a saddle riding vehicle. Referring to FIG. 1, the motorcycle 1 includes a front wheel 3 steered by a handle 5, and a rear wheel 4 driven by a power unit 10 including an engine. Hereinafter, the motorcycle is simply referred to as "a vehicle" in some cases.

Steering system parts including the handle 5 and the front wheel 3 are steerably supported by a head pipe 20 formed on a front end portion of a vehicle body frame 2. A handle steering shaft (not shown) connected to the handle 5 is inserted through the head pipe 20. The power unit 10 is disposed on a longitudinal central section of the vehicle body frame 2. A swing arm 6 is supported by a rear section of the power unit 10 to be vertically swingable about a pivot shaft 6a. A rear suspension (not shown) is interposed between a front section of the swing arm 6 and a rear section of the vehicle body frame 2.

For example, the vehicle body frame 2 is formed by integrally coupling a plurality of kinds of steel members through welding or the like. The vehicle body frame 2 includes a pair of left and right main frames 21 extending to be bent downward after extending rearward and downward from the head pipe 20, a cross member (not shown) extending in a vehicle width direction to connect the left and right main frames 21, and seat rails (not shown) extending rearward and upward from rear upper end portions of the left and right main frames 21.

A fuel tank 8 is disposed above the left and right main frames 21. A seat 9 is disposed behind the fuel tank 8 and above the seat rails (not shown).

The vehicle body frame 2 is covered with a vehicle body cover 7. The vehicle body cover 7 includes an upper cowl 7a configured to cover a front section of the vehicle body frame 2 from above, side cowls 7b configured to cover the front section of the vehicle body frame 2 from sides, and a lower cowl 7c configured to cover a lower section of the vehicle body frame 2.

In FIG. 1, reference numeral 14 designates a front fork, reference numeral 15 designates a front fender, reference numeral 16 designates a rear fender, reference numeral 17 designates a main step (an occupant step), and reference numeral 18 designates a muffler.

Figure 2:
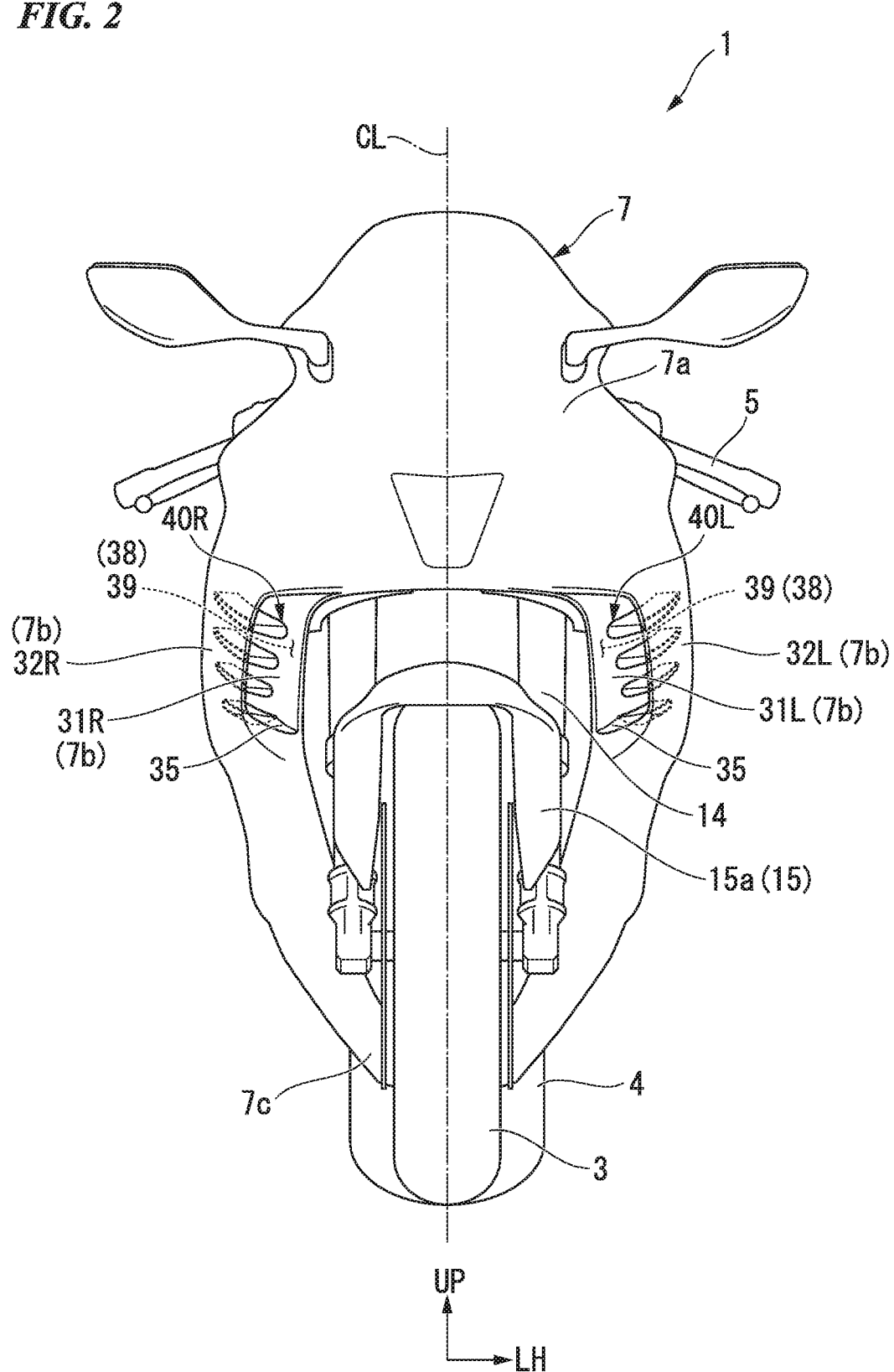
FIG. 2 is a front view of the motorcycle according to the embodiment.

As shown in FIG. 2, the motorcycle 1 includes the pair of left and right side cowls 7b configured to cover a part of a vehicle body from sides. The left and right side cowls 7b cover a front section of the vehicle body frame 2 from an outside in a vehicle width direction. In FIG. 2, reference numeral CL designates a vehicle body lateral centerline.

Hereinafter, in components of the vehicle, "L" is attached to the components disposed on the left side, and "R" is attached to the components disposed on the right side.

<Side Cowls 7b>

As shown in FIG. 2, the left and right side cowls 7b include a pair of left and right inner cowls 31L and 31R, a pair of left and right outer cowls 32L and 32R configured to cover the left and right inner cowls 31L and 31R from the outside in the vehicle width direction, and a pair of left and right air flow conditioning units 40L and 40R having air flow conditioning members configured to generate downforce using traveling air.

The left and right side cowls 7b (the left and right inner cowls 31L and 31R and the left and right outer cowls 32L and 32R) have a laterally symmetrical shape with a vehicle body lateral centerline CL as a symmetrical axis. An air guide path 38 configured to guide traveling air from a front side of the vehicle toward a rear side of the vehicle is formed between the inner cowls 31 and the outer cowls 32.

<Inner Cowls 31>

The inner cowls 31 configure inner portions of the side cowls 7b in the vehicle width direction. The inner cowls 31 are a portion of the side cowls 7b disposed closer to the vehicle body frame 2 (see FIG. 1). The inner cowls 31 are connected to a front lower end of the upper cowl 7a.

When seen from a front view, front edges of the left and right inner cowls 31L and 31R extend downward from the outside of the front fork 14 in the vehicle width direction after being curved from a front lower end of the upper cowl 7a toward an outer side of the front fork 14 in the vehicle width direction, and then are inclined to be disposed inward in the vehicle width direction as they go downward toward a lower section of the front wheel 3.

Figure 3:
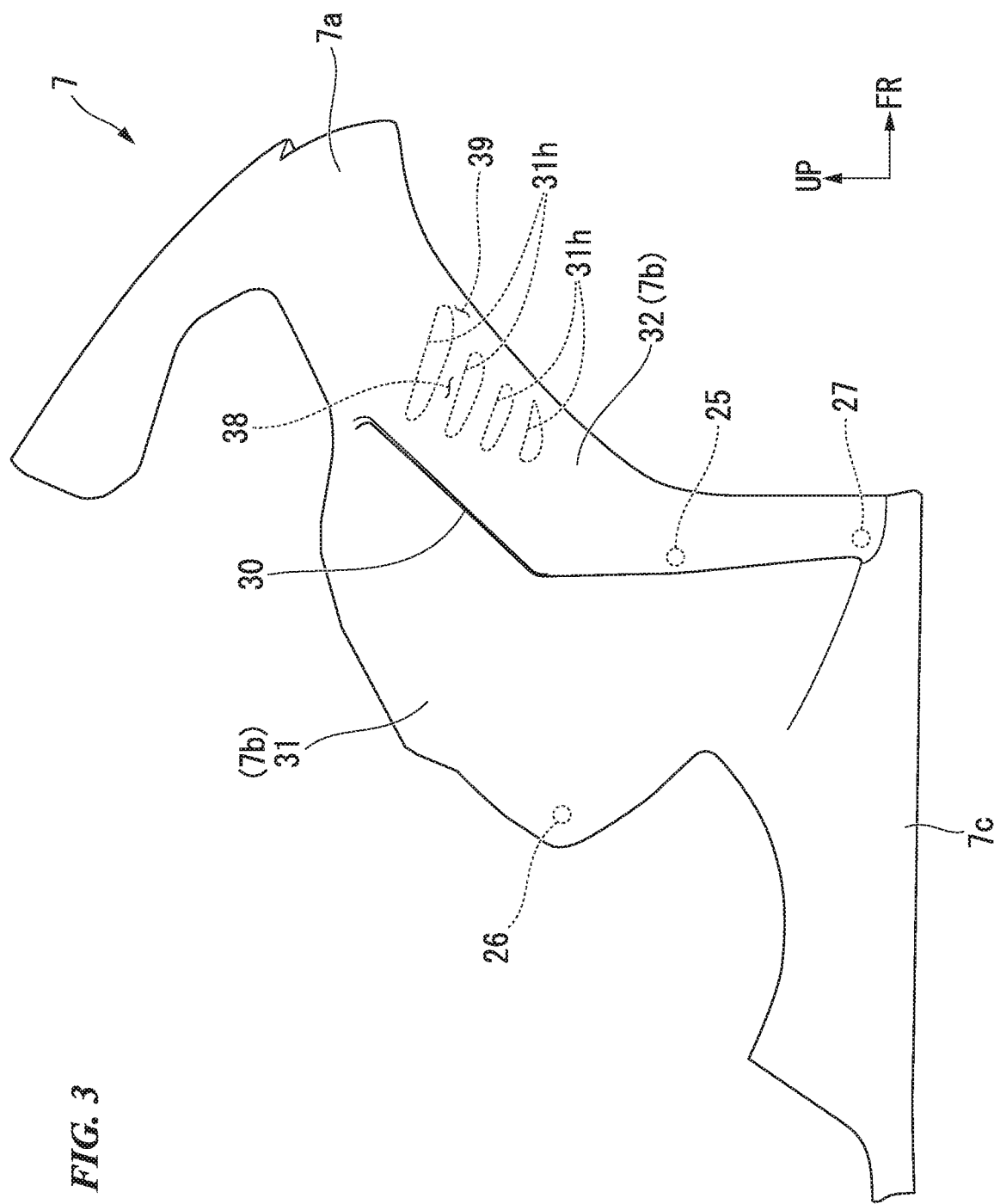
FIG. 3 is a right side view of a vehicle body cover according to the embodiment.

As shown in FIG. 3, when seen in a side view, front edges of the inner cowls 31 extend to be inclined to be disposed downward as they go rearward from a front lower end of the upper cowl 7a. Lower end portions of the inner cowls 31 are connected to the outer cowls 32. In FIG. 3, reference numeral 25 designates a fastening section between the inner cowls 31 and the outer cowls 32.

When seen in a side view, rear edges of the inner cowls 31 extend to be curved forward and downward after being inclined to be disposed downward as they go rearward to overlap front lower sections of the main frames 21 (see FIG. 1). Rear end portions of the inner cowls 31 are connected to the main frames 21 (see FIG. 1).

In FIG. 3, reference numeral 26 designates a fastening section between the inner cowls 31 and the main frame 21 (see FIG. 1).

Through-holes 31h that open in the vehicle width direction and through which air flow conditioning members 41 to 44 (see FIG. 4) can be inserted are formed in the inner cowls 31. The number of through-holes 31h that are formed corresponds to the number of air flow conditioning members 41 to 44 that are installed. The plurality of through-holes 31h are formed at intervals in an upward/downward direction. In the embodiment, the four through-holes 31h are formed. Each of the through-holes 31h opens with a size according to a size of one of the air flow conditioning members 41 to 44 for the corresponding air flow conditioning member 41 to 44 to be inserted therethrough with no gap.

<Outer Cowl 32>

As shown in FIG. 2, the outer cowls 32 configure outer portions of the side cowls 7b in the vehicle width direction. The outer cowls 32 form opening sections 39 configured to expose the air flow conditioning members 41 to 44 (see FIG. 4) forward together with the inner cowls 31. The opening sections 39 function as intake port of traveling air toward the air flow conditioning members 41 to 44. The traveling air introduced from the opening sections 39 flows along the air flow conditioning members 41 to 44, and then, are extracted to the outside via side openings 30 (see FIG. 1) of the side cowls 7b.

As shown in FIG. 3, the outer cowls 32 cover the inner cowls 31 from the outside in the vehicle width direction to form the air guide path 38 configured to guide the traveling air from a front side to a rear side between the inner cowls 31 and the outer cowls 32. The air guide path 38 opens the side cowls 7b in the forward/rearward direction. The air guide path 38 constitutes a flow path of air flowing along the air flow conditioning members 41 to 44 (see FIG. 4). The air guide path 38 functions as an intake port for traveling air toward the air flow conditioning members 41 to 44 and an outlet port for traveling air flowing along the air flow conditioning members 41 to 44.

As shown in FIG. 1, when seen in a side view, the outer cowls 32 are disposed behind and above the front wheel 3. A vertical length of the outer cowls 32 is smaller than a vertical length of the inner cowls 31. When seen in a side view, front edges of the outer cowls 32 constitute front edges of the side cowls 7b. When seen in a side view, the front edges of the outer cowls 32 extend to be bent downward after being inclined to be disposed downward as they go rearward. When seen in a side view, upper sections of the front edge of the outer cowls 32 are inclined along the front edges of the inner cowls 31.

As shown in FIG. 3, when seen in a side view, rear edges of the outer cowls 32 extend to be bent downward after being inclined to be disposed downward as they go rearward. When seen in a side view, upper sections of the rear edges of the outer cowls 32 are inclined to overlap longitudinal central sections of the inner cowls 31. Lower end portions of the outer cowls 32 are connected to a front lower end portion of the lower cowl 7c. In FIG. 3, reference numeral 27 designates a fastening section of the outer cowls 32 and the lower cowl 7c.

<Air Flow Conditioning Members 41 to 44>

Figure 5:
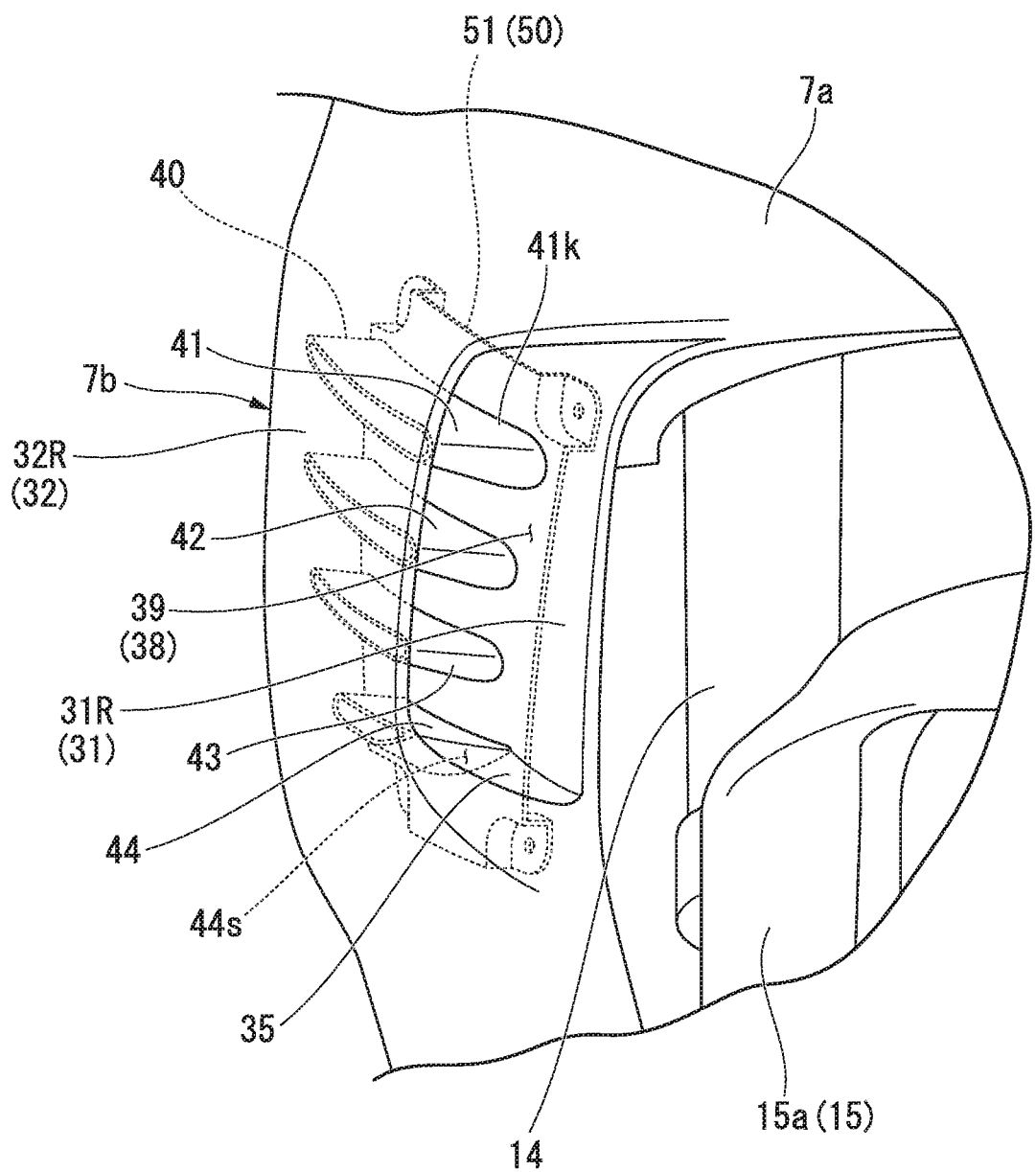
FIG. 5 is an enlarged front view of the major part of the side cowl according to the embodiment.

As shown in FIG. 5, the air flow conditioning members 41 to 44 are provided in the air guide path 38. When seen from a front view, the air flow conditioning members 41 to 44 are provided on each of the left and right side cowls 7b. When seen from a front view, the air flow conditioning members 41 to 44 are directed from the left and right inner cowls 31L and 31R toward inner surfaces of the left and right outer cowls 32L and 32R in the vehicle width direction. The air flow conditioning members 41 to 44 generate downforce using traveling air flowing rearward through the air guide path. When seen from a front view, the left and right air flow conditioning members 41 to 44 have a laterally symmetrical shape using the vehicle body lateral centerline CL as a symmetrical axis. Hereinafter, the air flow conditioning members 41 to 44 on the right side among the left and right air flow conditioning members 41 to 44 will be described. Since the left air flow conditioning members 41 to 44 have the same configurations as those of the right air flow conditioning members 41 to 44, detailed description thereof will be omitted.

Figure 4:
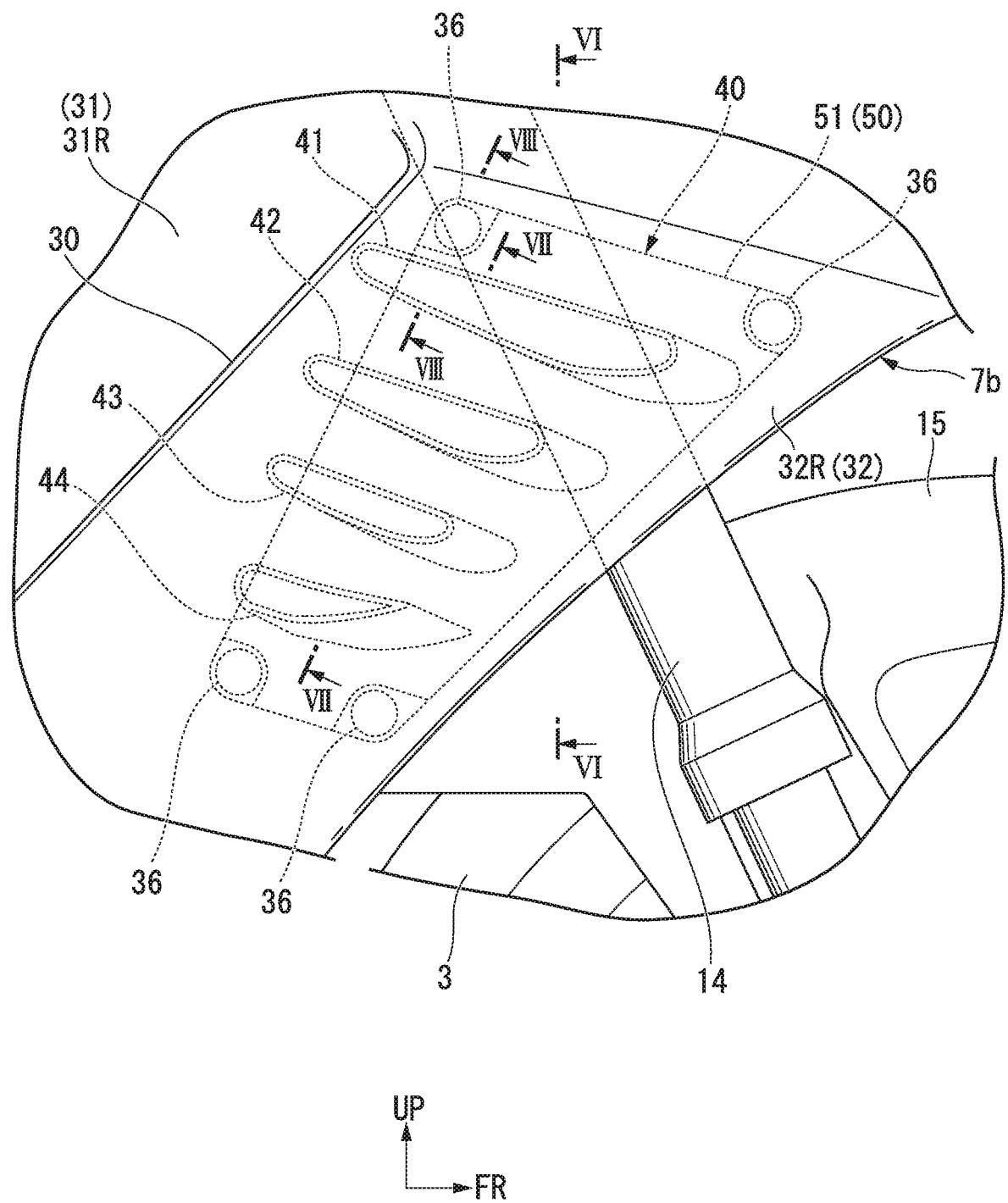
FIG. 4 is an enlarged right side view showing a major part of a side cowl according to the embodiment.

As shown in FIG. 4, the plurality of air flow conditioning members 41 to 44 are provided at intervals in the upward/downward direction. In the embodiment, the four air flow conditioning members 41 to 44 are provided. Hereinafter, the four air flow conditioning members 41 to 44 are referred to as "a first wing 41," "a second wing 42," "a third wing 43" and "a fourth wing 44" in sequence from above. The first wing 41 (a first air flow conditioning member) is disposed at the uppermost position among the four wings 41 to 44. The fourth wing 44 (a second air flow conditioning member) is disposed at the lowermost position among the four wings 41 to 44.

The first wing 41 is larger than the fourth wing 44. The four wings 41 to 44 have sizes that are reduced in sequence of the first wing 41, the second wing 42, the third wing 43 and the fourth wing 44.

Figure 9:
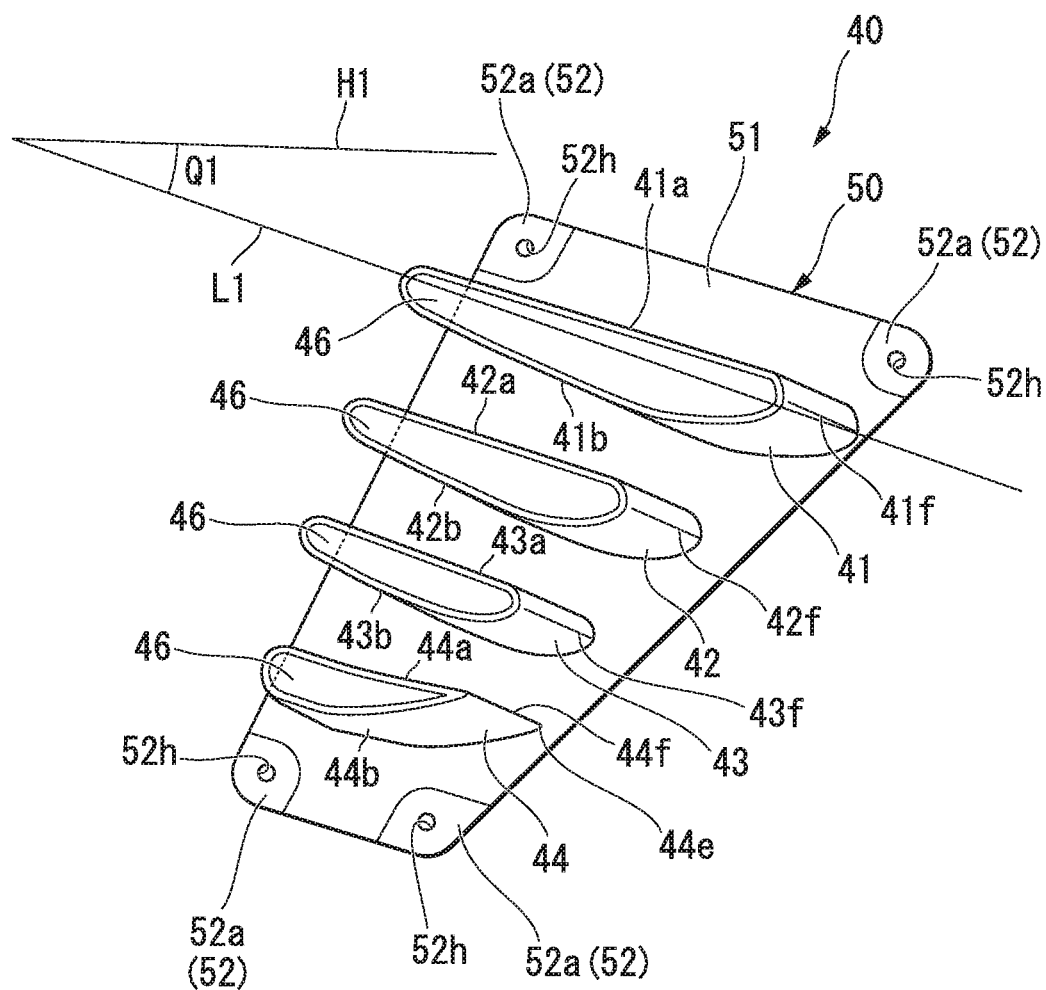
FIG. 9 is a right side view of an air flow conditioning unit according to the embodiment.

Here, as shown in FIG. 9, an area of a surface obtained by adding an upper surface 41a and a lower surface 41b of the first wing 41 is defined as a first wing surface area A1, an area of a surface obtained by adding an upper surface 42a and a lower surface 42b of the second wing 42 is defined as a second wing surface area A2, an area of a surface obtained by adding an upper surface 43a and a lower surface 43b of the third wing 43 is defined as a third wing surface area A3, and an area of a surface obtained by adding an upper surface 44a and a lower surface 44b of the fourth wing 44 is defined as a fourth wing surface area A4. The wing surface areas A1 to A4 have a relation of A1>A2>A3>A4.

When seen in a side view, the wings 41 to 44 are inclined to be disposed upward as they go rearward. That is, the wings 41 to 44 are inclined forward with respect to a horizontal plane. When seen in a side view, the four wings 41 to 44 are disposed in a longitudinal width of the outer cowls 32. When seen in a side view, the four wings 41 to 44 have longitudinal widths that are reduced in sequence of the first wing 41, the second wing 42, the third wing 43 and the fourth wing 44. When seen in a side view, front end positions of the wings 41 to 44 are disposed rearward in sequence of the first wing 41, the second wing 42, the third wing 43 and the fourth wing 44. When seen in a side view, parts of the first wing 41 and the second wing 42 overlap the front fork 14.

When seen in a side view, the upper surfaces 41a to 44a of the wings 41 to 44 are inclined to be disposed upward as they go rearward. When seen in a side view, the lower surfaces 41b to 44b of the wings 41 to 44 have a convex shape curved forward and downward. When seen in a side view, the lower surfaces 41b to 44b of the wings 41 to 44 are inclined to be disposed upward as they go rearward behind the curved surface.

For example, the wings 41 to 44 have a shape obtained by vertically inverting a wing (a main wing) of an airplane. As shown in FIG. 9, the wings 41 to 44 are formed in a wing shape continuously extending in the forward/rearward direction. Here, a straight line L1 that connects a front edge and a rear edge of each of the wings 41 to 44 (in FIG. 9, the first wing 41) is referred to as "a chord line L1." The lower surfaces 41b to 44b of the wings 41 to 44 are curved to protrude forward and downward with respect to the chord line L1.

An elevation angle Q1 of each of the wings 41 to 44 is negative. Here, the elevation angle Q1 is a value representing an angle at which the wing is inclined with respect to a flow of traveling air. When the flow of the traveling air is a flow along a horizontal line H1, the elevation angle Q1 is an angle formed between the chord line L1 and the horizontal line HE The elevation angle Q1 is positive upon forward rising using a reference when the chord line L1 is parallel to the horizontal line HE In the embodiment, since the chord line L1 is inclined forward and downward with respect to the horizontal line H1, the elevation angle Q1 is negative.

Figure 10:
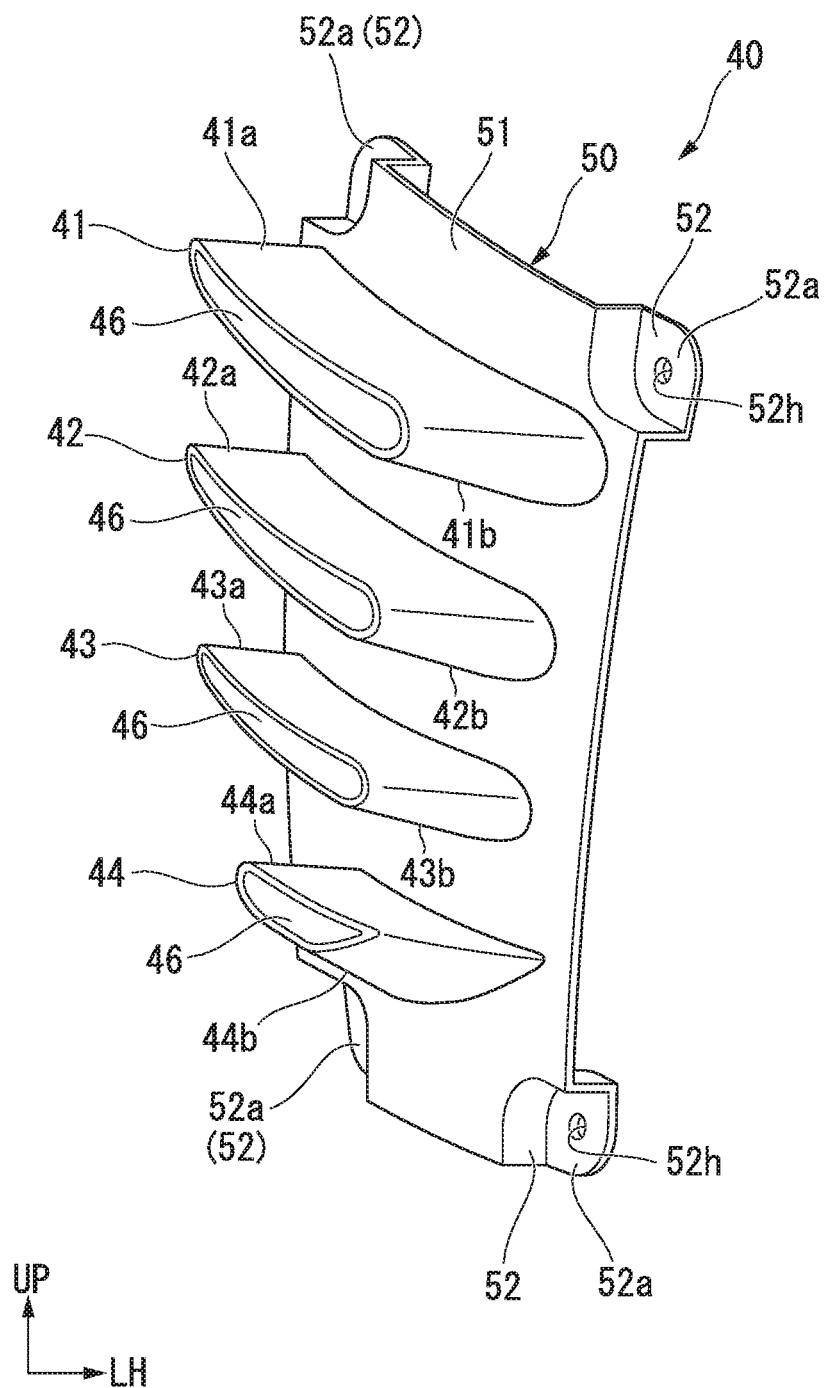
FIG. 10 is a front view of the air flow conditioning unit according to the embodiment.

As shown in FIG. 10, when seen from a front view, the wings 41 to 44 are inclined to be disposed upward as they go outward in the vehicle width direction. When seen from a front view, the wings 41 to 44 have vertical widths that are reduced outward in the vehicle width direction. When seen from a front view, each of the lower surfaces 41b to 44b of the wings 41 to 44 are inclined to be disposed upward as they go outward in the vehicle width direction more steeply than the upper surfaces 41a to 44a.

Figure 6:
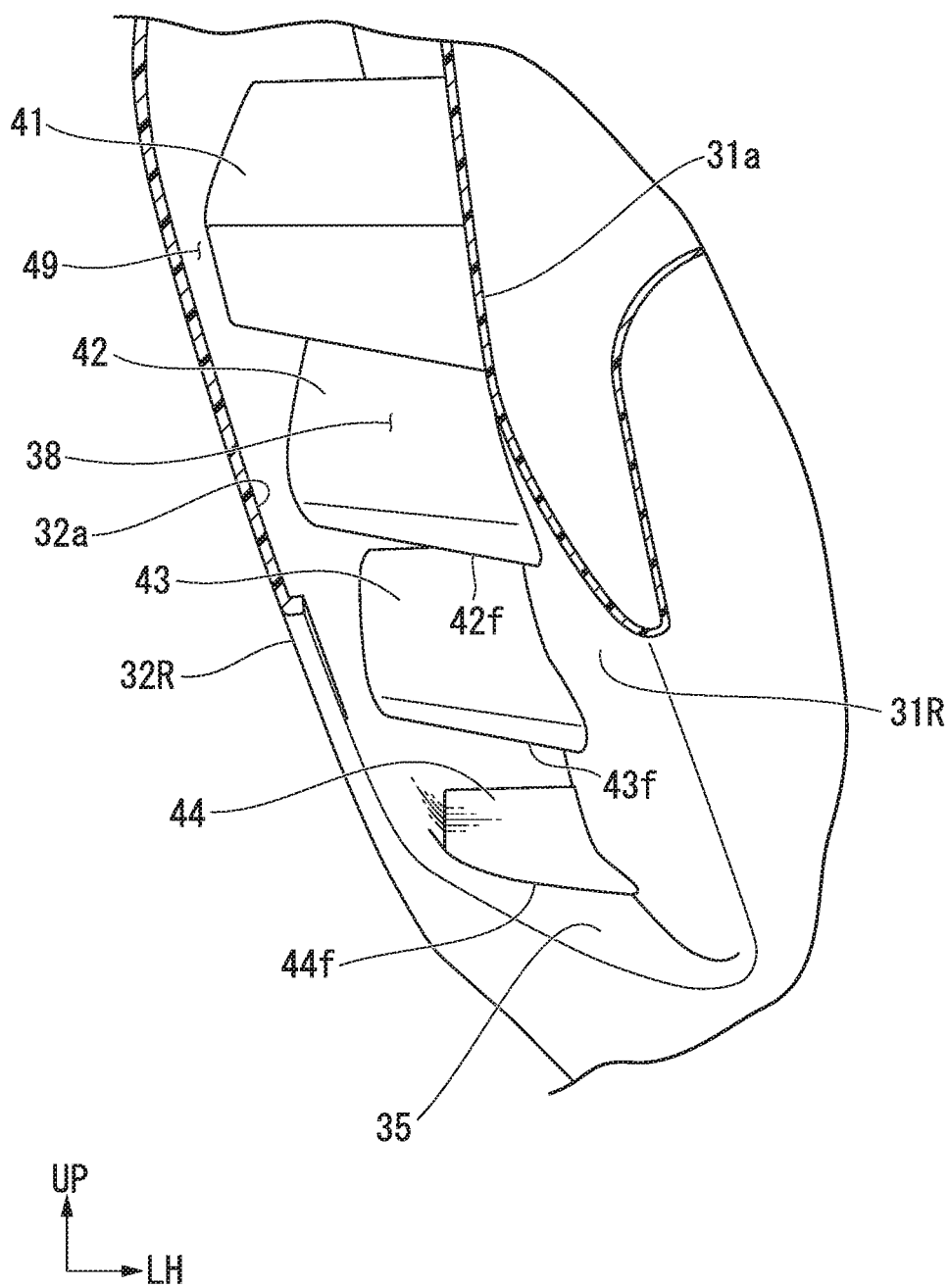
FIG. 6 is a perspective view including a cross section taken along line VI-VI in
FIG. 4.

As shown in FIG. 6, front edges 41f to 44f (see FIG. 9) of the wings 41 to 44 are inclined to be disposed forward as they go inward in the vehicle width direction. In FIG. 6, cross-section hatching of the first wing 41 is omitted. In the first wing 41, the second wing 42 and the third wing 43, inclination levels of the front edge 41f to 43f (see FIG. 9) are substantially the same as each other.

Figure 7:
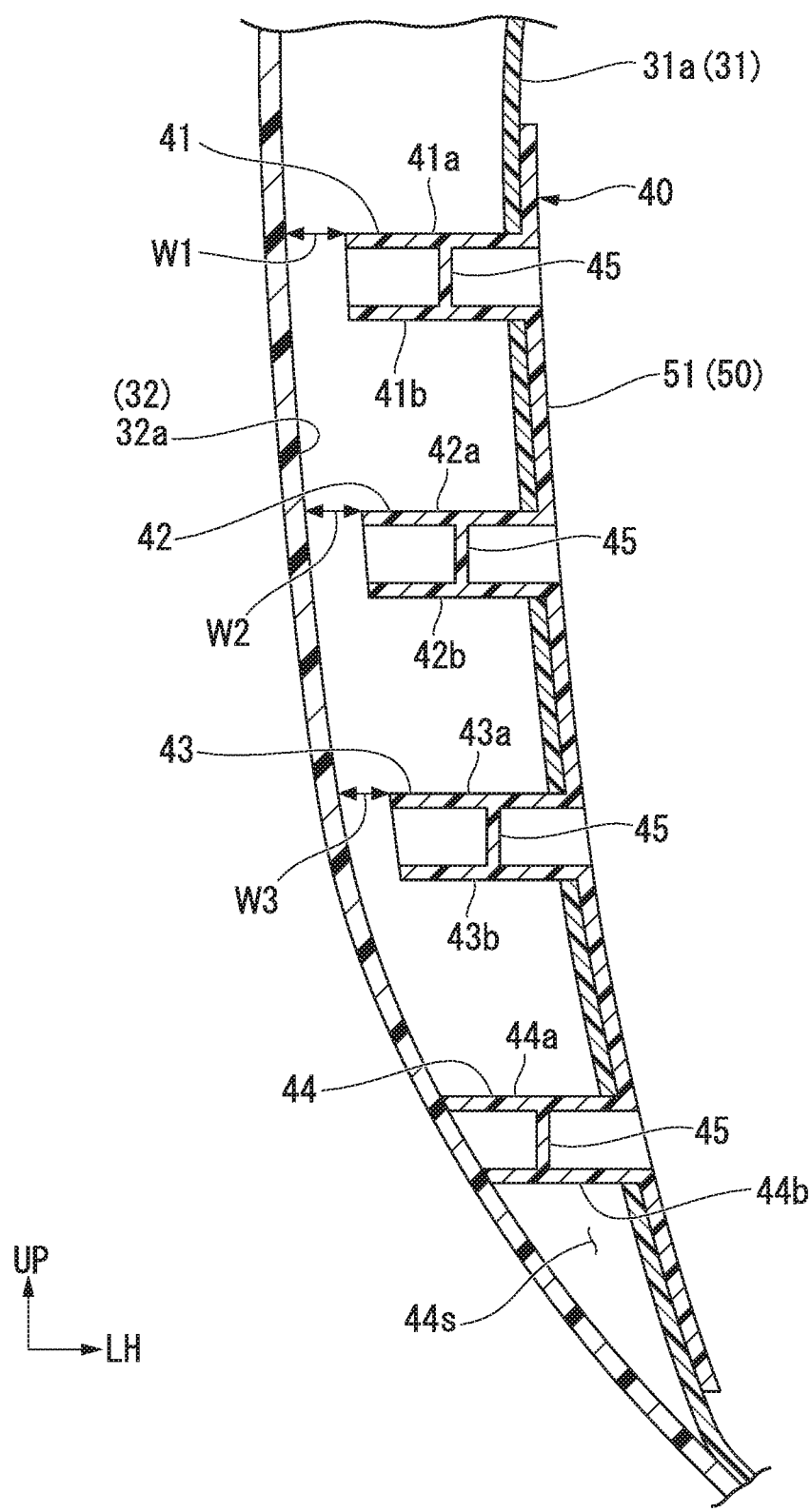
FIG. 7 is a cross-sectional view taken along line VII-VII in FIG. 4.

As shown in FIG. 7, outer end portions of the wings 41 to 44 in the vehicle width direction have concave sections 46 (see FIG. 8) recessed inward in the vehicle width direction. Inner end portions of the wings 41 to 44 in the vehicle width direction have concave sections 47 (hereinafter, also referred to as "the inner concave sections 47") (see FIG. 8) recessed outward in the vehicle width direction. As shown in FIG. 9, the concave sections 46 and the inner concave sections 47 (see FIG. 8) are continuously formed in an extension direction (the forward/rearward direction) of the wings 41 to 44. Since occurrence of sink marks (dents) on surfaces of the wings 41 to 44 due to volume contraction caused by cooling upon resin molding can be suppressed by forming the concave sections 46 and the inner concave sections 47, surfaces of the wings 41 to 44 are likely to become smooth surfaces, and traveling air can be effectively guided. In addition, reduction in weights of the wings 41 to 44 can be achieved.

As shown in FIG. 7, a reinforced wall 45 (see FIG. 8) is provided on a central section of each of the wings 41 to 44 in the vehicle width direction. When seen in a cross-sectional view, each of the wings 41 to 44 has an H shape. Accordingly, strength and rigidity of each of the wings 41 to 44 are increased.

As shown in FIG. 5, a closing section 35 configured to close a space 44s (see FIG. 7) below the fourth wing 44 from a front side is provided on the side cowl 7b. The closing section 35 extends to connect a front end 44e (see FIG. 9) of the upper surface 44a of the fourth wing 44 and a front edge of the outer cowl 32. The closing section 35 also functions as a guide surface configured to guide traveling air to the upper surface 44a of the fourth wing 44.

As shown in FIG. 6 and FIG. 7, the first wing 41, the second wing 42 and the third wing 43 are separated from an inner surface 32a of the outer cowls 32 in the vehicle width direction. The fourth wing 44 abuts the inner surface 32a of the outer cowls 32 in the vehicle width direction.

Here, an interval between an outer end of the upper surface 41a of the first wing 41 in the vehicle width direction and the inner surface 32a of the outer cowl 32 in the vehicle width direction is defined as a first interval W1, an interval between an outer end of the upper surface 42a of the second wing 42 in the vehicle width direction and the inner surface 32a of the outer cowl 32 in the vehicle width direction is defined as a second interval W2, and an interval between an outer end of the upper surface 43a of the third wing 43 in the vehicle width direction and the inner surface 32a of the outer cowl 32 in the vehicle width direction is defined as a third interval W3. As shown in FIG. 7, the intervals W1 to W3 have substantially the same interval (W1≈W2≈W3).

As shown in FIG. 6, a communication space 49 configured to bring the outsides in the vehicle width direction of the first wing 41, the second wing 42 and the third wing 43 in communication with each other in the upward/downward direction in the air guide path 38 is formed between the inner cowl 31 and the outer cowl 32. The communication space 49 is a space formed in each of the first interval W1, the second interval W2 and the third interval W3. The communication space 49 is formed throughout in the upward/downward direction to form a flow path of air between outer ends of the first wing 41, the second wing 42 and the third wing 43 in the vehicle width direction and the inner surface 32a of the outer cowl 32 in the vehicle width direction. The communication space 49 is in communication with the air guide path 38.

<Connecting Member 50>

As shown in FIG. 7, a connecting member 50 configured to connect inner ends of the four wings 41 to 44 in the vehicle width direction is provided on an inner surface 31a of the inner cowl 31 in the vehicle width direction. The four wings 41 to 44 and the connecting member 50 are formed integrally with the same member. The four wings 41 to 44 and the connecting member 50 constitute an air flow conditioning unit 40. For example, the air flow conditioning unit 40 is formed of a resin.

Figure 8:
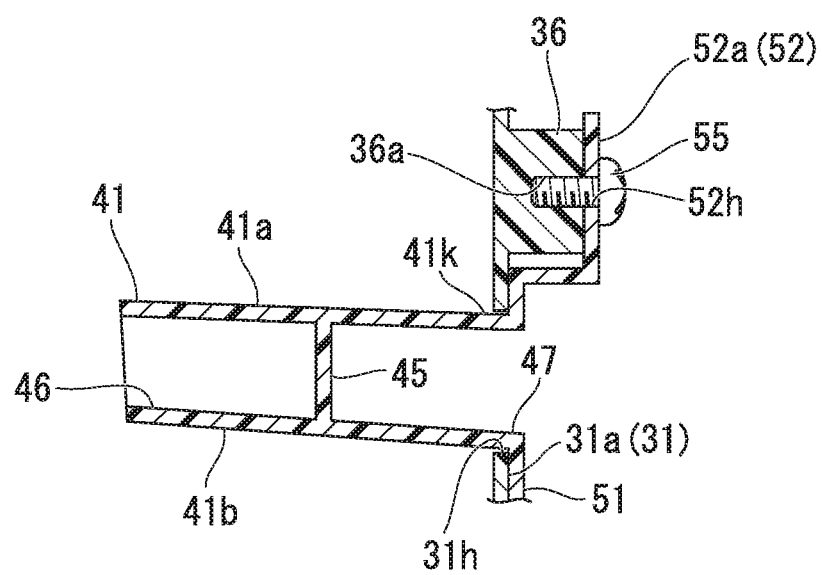
FIG. 8 is a cross-sectional view taken along line VIII-VIII in FIG. 4.

As shown in FIG. 8, the boss section 36 swelling inward in the vehicle width direction is provided on the inner surface 31a of the inner cowl 31 in the vehicle width direction. As shown in FIG. 4, the plurality of boss sections 36 are provided on the inner cowl 31. In the embodiment, the four boss sections 36 are provided.

As shown in FIG. 10, the connecting member 50 includes a plate-shaped connecting plate 51 formed along the inner surface 31a (see FIG. 7) of the inner cowl 31 in the vehicle width direction, and boss receiving sections 52 swelling inward from four corners of the connecting plate 51 in the vehicle width direction. As shown in FIG. 4, when seen in a side view, the connecting plate 51 is disposed in a longitudinal width of the outer cowl 32. In the embodiment, the four boss receiving sections 52 (see FIG. 10) are provided at positions corresponding to the four boss sections 36.

When seen in a side view, the boss sections 36 (the boss receiving sections 52 shown in FIG. 10) are disposed on a front upper side of the first wing 41, a rear upper side of the first wing 41, a front lower side of the fourth wing 44, and a rear lower side of the fourth wing 44. As shown in FIG. 10, seat surface sections 52a configured to receive the boss sections 36 (see FIG. 8) are provided on the boss receiving sections 52. Hole sections 52h that open in the vehicle width direction are formed in the seat surface sections 52a, respectively. As shown in FIG. 8, female screw sections 36a that open in the vehicle width direction are formed in the boss sections 36, respectively.

For example, in a state in which each of the boss sections 36 is abutting each of the seat surface sections 52a, since bolts 55 are inserted through the hole sections 52h and the bolts 55 are screwed into the female screw sections 36a, the connecting member 50 can be attached to the inner cowls 31. In the embodiment, since the four wings 41 to 44 and the connecting member 50 are formed integrally with each other, the four wings 41 to 44 can be simultaneously attached to the inner cowls 31 by simply attaching the connecting member 50 to the inner cowls 31.

The through-holes 31h (in FIG. 8, only the through-holes 31h for the first wing 41 is shown) that open in the vehicle width direction and through which the wings 41 to 44 can be inserted are formed in the inner cowls 31 (see FIG. 3). The wings 41 to 44 are attached to the inner surface 31a of the inner cowls 31 in the vehicle width direction to be directed toward the inner surface 32a of the outer cowls 32 in the vehicle width direction through the through-holes 31h (see FIG. 7).

<Actions of Wings 41 to 44>

The upper surfaces 41a to 44a of the wings 41 to 44 are disposed to face the air guide path 38.

For this reason, traveling air hits the upper surfaces 41a to 44a of the wings 41 to 44. The wings 41 to 44 physically generate downforce using air resistance as the traveling air hits the upper surfaces 41a to 44a.

When seen from a front view, a vertical space of the wings (the first wing 41, the second wing 42 and the third wing 43) except the fourth wing 44 is exposed forward and rearward (in communication with the intake port and the outlet port for traveling air of the air guide path 38 in the forward/rearward direction). When seen from a front view, a lower space 44s of the fourth wing 44 is closed by the closing section 35 from a front side (is not in communication with the intake port for traveling air of the air guide path 38 in the forward/rearward direction). Accordingly, the wings (the first wing 41, the second wing 42 and the third wing 43) except the fourth wing 44 generate downforce using a pressure difference generated by a speed difference of air flowing above and below the wing.

The fourth wing 44 does not generate downforce due to a pressure difference between above and below according to an action of the closing section 35. The fourth wing 44 generates downforce like a so-called canard, which generates downforce only by the traveling air hitting the upper surface 44a.

<Disposition of Front Fender 15>

Figure 11:
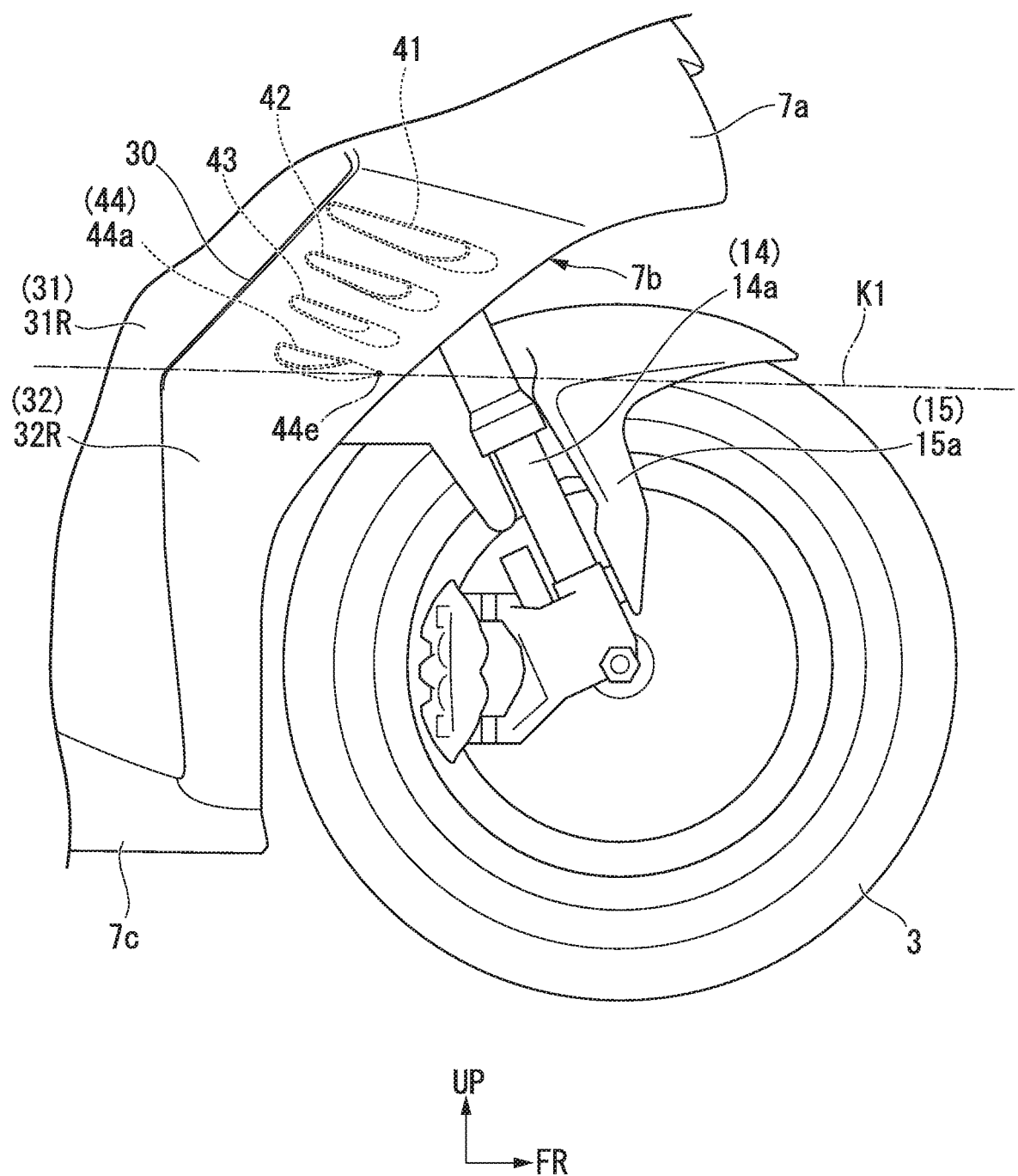
FIG. 11 is a right side view for explaining disposition of a fork cover section according to the embodiment.

In FIG. 11, reference numeral 15 designates a front fender configured to cover the front wheel 3 from above. As shown in FIG. 11, the front fender 15 includes a fork cover section 15a configured to cover a lower section of the front fork 14 from a front side. In the embodiment, the fork cover section 15a is a portion of the front fender 15 configured to cover an exposure section of an inner tube 14a of the front fork 14 from a front side. When seen in a side view, the fork cover section 15a is disposed below the front end 44e of the upper surface 44a of the fourth wing 44.

In FIG. 11, reference numeral K1 designates a horizontal line passing through the front end 44e of the upper surface 44a of the fourth wing 44 (hereinafter, also referred to as "a horizontal virtual line"). The fork cover section 15a is disposed in a region below a horizontal virtual line K1 as a whole. Accordingly, air from the fork cover section 15a (in particular, a portion which has a large air flow conditioning area and which is configured to cover an exposure section of the inner tube 14a from a front side) that can be easily affected by steering of the front wheel 3 cannot easily hit the fourth wing 44. For this reason, restraint of steering of the front wheel 3 can be suppressed.

<Disposition of Handle Grip 5a>

Figure 12:
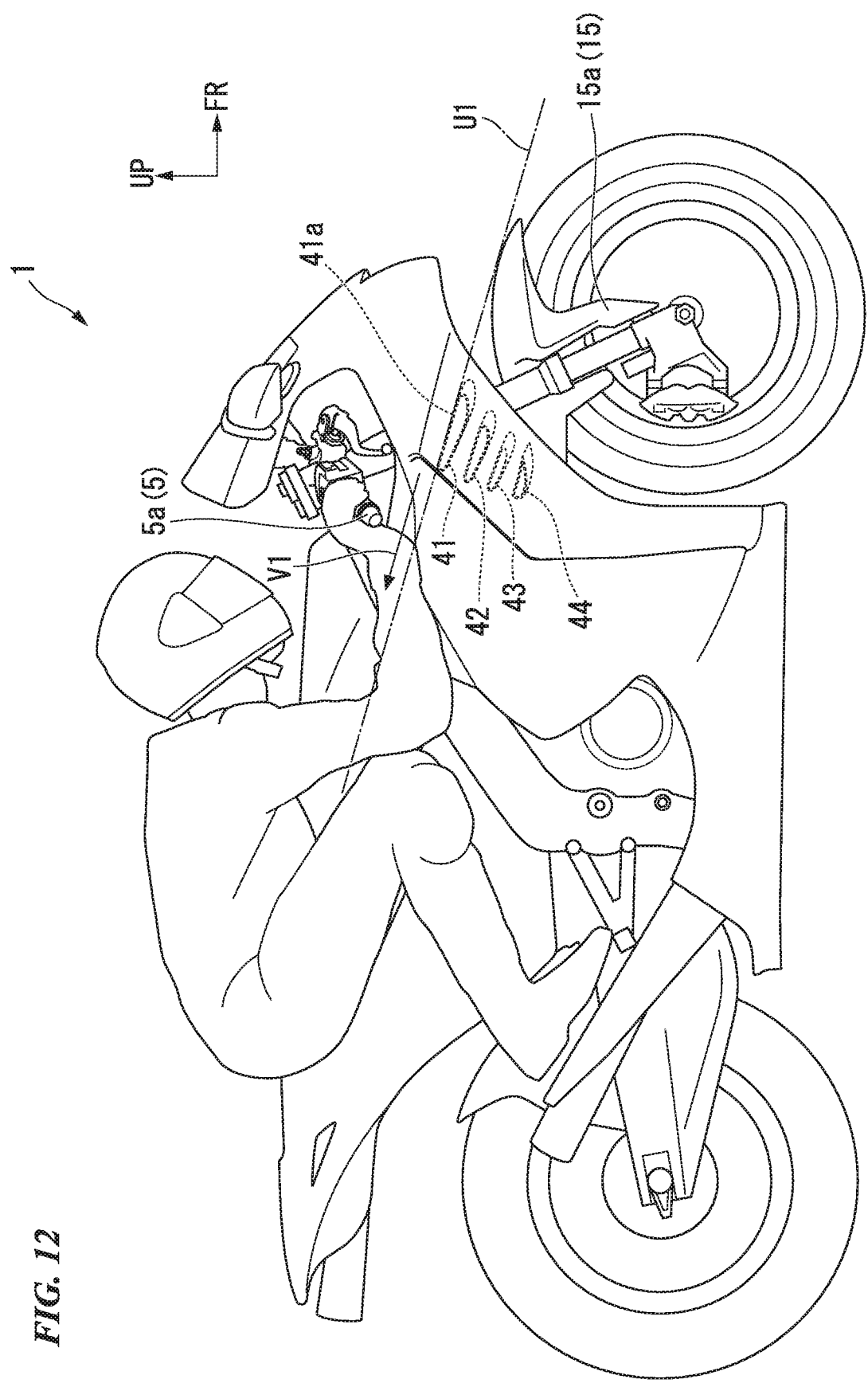
FIG. 12 is a right side view for explaining disposition of a grip end according to the embodiment.

In FIG. 12, reference numeral 5a designates a handle grip that is able to be gripped by an occupant. As shown in FIG. 12, the upper surface 41a of the first wing 41 extends to be inclined so as to be disposed upward as it goes rearward. When seen in a side view, an outer end of a handle grip 5a in the vehicle width direction (hereinafter, also referred to as "a grip end") is disposed above a rear end of the upper surface 41a of the first wing 41.

In FIG. 12, reference numeral U1 designates an extension line of the upper surface 41a of the first wing 41. When seen in a side view, the grip end is disposed in a region above an extension line U1 as a whole. Accordingly, air flowing along the upper surface 41a of the first wing 41 is hard to hit an occupant's hands, which easily become a resistance with respect to the traveling air, when a throttle opening operation is performed. In FIG. 12, reference numeral V1 designates a flow direction of air flowing along the upper surface 41a of the first wing 41.

Both of generation of downforce and steerability are easily realized by providing all of the wings 41 to 44 from the first wing 41 (the first air flow conditioning member) disposed at the uppermost position to the fourth wing 44 (the second air flow conditioning member) disposed at the lowermost position above the fork cover section 15a and below the handle grip 5a when seen in a side view.

As described above, the embodiment provides the motorcycle 1 including the side cowls 7b configured to cover a part of the vehicle body frame 2, wherein the side cowls 7b include the inner cowls 31, the outer cowls 32 configured to cover the inner cowls 31 from an outer side in the vehicle width direction to form the air guide path 38 configured to guide traveling air from a front side to a rear side between the inner cowls 31 and the outer cowls 32, and the air flow conditioning members 41 configured to generate downforce using traveling air directed from the inner cowls 31 to the inner surfaces 32a of the outer cowls 32 in the vehicle width direction and flowing through the air guide path 38, and the air flow conditioning member 41 is separated from the inner surfaces 32a of the outer cowls 32 in the vehicle width direction.

According to the configuration, since the side cowls 7b include the air flow conditioning members 41 configured to generate downforce using traveling air directed from the inner cowls 31 to the inner surfaces 32a of the outer cowls 32 in the vehicle width direction and flowing through the air guide path 38, the following effects can be exhibited. In comparison with the structure configured to generate downforce using the aerodynamic force generating unit disposed above the upper surface of the front cowl, an influence of downforce applied to an upper side of the vehicle can be reduced. In addition, since the air flow conditioning members 41 are separated from the inner surfaces 32a of the outer cowls 32 in the vehicle width direction, the following effects are exhibited. Since the traveling air on the outer end portion of the air flow conditioning member 41 in the vehicle width direction can be separated from the air flow conditioning member 41 while generating downforce by receiving traveling air on the air flow conditioning member 41, appropriate steerability can be obtained. Accordingly, both of generation of downforce and steerability are easily realized.

In the embodiment, since the communication space 49 in communication with the outer side in the vehicle width direction of the air flow conditioning member 41 in the upward/downward direction is formed between the inner cowls 31 and the outer cowls 32, the following effects are exhibited. Since the traveling air that has generated the downforce can join traveling air in another space through the communication space 49 outside the air flow conditioning member 41 in the vehicle width direction while appropriately generating the downforce by receiving the traveling air in the inner portion of the air flow conditioning member 41 in the vehicle width direction, the downforce can be appropriately suppressed and steerability can be improved. In addition, generation of downforce and adjustment of steerability can be easily performed by adjusting the size of the communication space 49.

In the embodiment, since the front edge 41f of the air flow conditioning member 41 is inclined so as to be disposed forward as it goes inward in the vehicle width direction, the following effects are exhibited. Since the traveling air flowing from the inside in the vehicle width direction can be more easily received first at the inner portion of the air flow conditioning member 41 in the vehicle width direction, and then, a flow of the traveling air to the outside in the vehicle width direction is easily formed, both of generation of downforce and steerability are easily realized.

In the embodiment, since occurrence of sink marks (dents) on a surface of the air flow conditioning member 41 due to volume contraction by cooling during resin molding can be suppressed as the outer end portion of the air flow conditioning member 41 in the vehicle width direction has the concave sections 46 recessed inward in the vehicle width direction, a surface of the air flow conditioning member 41 easily becomes a smooth surface, and traveling air can be effectively guided.

In the embodiment, since the communication space 49 can be easily formed between an outer portion of the air flow conditioning member 41 in the vehicle width direction and an inner surface of the outer cowls 32 in the vehicle width direction as the outer end portion of the air flow conditioning member 41 in the vehicle width direction has a plane 48 facing the inner surface of the outer cowl 32 in the vehicle width direction, both of generation of downforce and steerability are easily realized.

In the embodiment, since the plurality of air flow conditioning members 41 are provided at intervals in the upward/downward direction and the connecting members 50 configured to connect inner ends of the plurality of air flow conditioning members 41 to 44 in the vehicle width direction are provided, the following effects are exhibited. Since attachment of the plurality of air flow conditioning members 41 to 44 can be simultaneously performed by simply attaching the connecting member 50 to a predetermined portion (the inner cowls 31), attachment man-hours can be reduced. In addition, in comparison with the case in which attachments of the air flow conditioning members 41 to 44 are individually performed, attachment position accuracy of the air flow conditioning members 41 to 44 can be improved.

In the embodiment, since the plurality of air flow conditioning members 41 to 44 and the connecting member 50 can be simultaneously formed as the plurality of air flow conditioning members 41 to 44 and the connecting member 50 are formed integrally with the same member, molding man-hours can be reduced.

In the embodiment, since the through-holes 31h that open in the vehicle width direction and through which the air flow conditioning member 41 can pass are formed in the inner cowls 31 and the air flow conditioning members 41 are attached to the inner surfaces 31a of the inner cowls 31 in the vehicle width direction so as to be directed toward the inner surfaces 32a of the outer cowls 32 in the vehicle width direction through the through-holes 31h, the following effects are exhibited. In comparison with a case in which the air flow conditioning members 41 are attached to the outer surfaces of the inner cowls 31 in the vehicle width direction, a portion 41k of the inner portion of the air flow conditioning member 41 in the vehicle width direction facing the air guide path 38 (the base end portion 41k of the air flow conditioning member 41 in the air guide path 38, see FIG. 5) can function as a portion that generates downforce. In addition, occurrence of a step section for attachment or the like to the outer surface of the inner cowl 31 in the vehicle width direction can be avoided.

In the embodiment, since the plurality of air flow conditioning members 41 are provided at intervals in the upward/downward direction, the plurality of air flow conditioning members 41 to 44 include the first air flow conditioning member 41 and the second air flow conditioning member 44 disposed below the first air flow conditioning member 41, and the first air flow conditioning member 41 is larger than the second air flow conditioning member 44, the following effects are exhibited. In the first air flow conditioning member 41 larger than the second air flow conditioning member 44, since the traveling air flowing from a front side of the vehicle is easily caught, downforce can be effectively generated. In addition, in the second air flow conditioning member 44 smaller than and provided below the first air flow conditioning member 41, since the traveling air flowing from the vicinity of the front wheel 3 disposed therebelow cannot be easily caught, steering of the front wheel 3 can be easily performed.

In the embodiment, since the plurality of air flow conditioning members 41 are provided at intervals in the upward/downward direction, the plurality of air flow conditioning members 41 to 44 include the first air flow conditioning member 41 and the second air flow conditioning member 44 disposed below the first air flow conditioning member 41, and the closing section 35 configured to close the space 44s below the second air flow conditioning member 44 from a front side is provided on the side cowls 7b, the following effects are exhibited. Since the closing section 35 makes it difficult for the second air flow conditioning member 44 to catch the traveling air flowing from the vicinity of the front wheel 3 disposed therebelow, steering of the front wheel 3 can be easily performed.

In the embodiment, since the upper surface 44a of the second air flow conditioning member 44 extends to be inclined so as to be disposed upward as it goes rearward when seen in a side view, the following effects are exhibited. The traveling air flowing from a front side or an upper side of the vehicle easily hits the upper surface of the second air flow conditioning member 44, and downforce can be obtained such as like a canard.

In the embodiment, since the front fender 15 configured to cover the front wheel 3 from above is provided, the front fender 15 includes the fork cover section 15a configured to cover a part of the front fork 14 from a front side, and the fork cover section 15a is disposed below the front end 44e of the upper surface 44a of the second air flow conditioning member 44, the following effects are exhibited. Since the traveling air flow conditioned by the fork cover section 15a cannot be easily caught by the second air flow conditioning member 44, steering of the front wheel 3 can be easily performed.

In the embodiment, since the handle grip 5a that can be gripped by an occupant is further provided, the upper surface 41a of the air flow conditioning member 41 extends to be inclined so as to be disposed upward as it goes rearward when seen in a side view, and the outer end of the handle grip 5a in the vehicle width direction is disposed above the extension line U1 of the upper surface 41a of the air flow conditioning member 41 when seen in a side view, the following effects are exhibited. Since occurrence of a resistance due to hitting of the traveling air flowing along the upper surface 41a of the air flow conditioning member 41 against an occupant (a rider)'s arms can be suppressed, it is possible to suppress inhibition of downforce effect of the air flow conditioning member 41.

<Variant>

Figure 13:
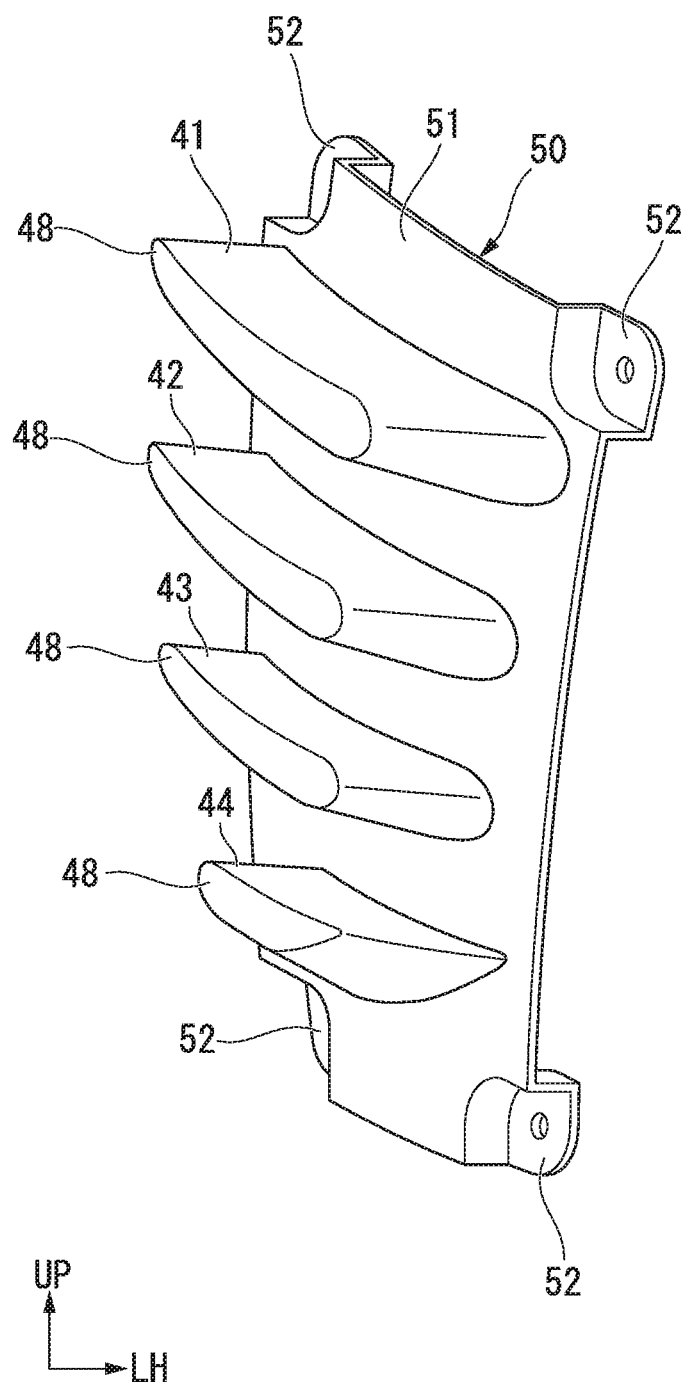
FIG. 13 is a front view of an air flow conditioning unit according to a variant of the embodiment.

While the example (see FIG. 10) in which the outer end portions of the air flow conditioning members 41 to 44 in the vehicle width direction have the concave sections 46 recessed inward in the vehicle width direction has been exemplarily described in the embodiment, there is no limitation thereto. For example, as shown in FIG. 13, the outer end portions of the air flow conditioning members 41 to 44 in the vehicle width direction may have the planes 48 facing the inner surfaces 32a of the outer cowls 32 in the vehicle width direction. According to the configuration, since the communication space 49 is easily formed between the outer portions of the air flow conditioning members 41 to 44 in the vehicle width direction and the inner surfaces 32a of the outer cowls 32 in the vehicle width direction, both of generation of downforce and steerability are easily realized.

For example, the planes 48 in the outer end portions of the air flow conditioning members 41 to 44 in the vehicle width direction may be provided by not forming the concave sections 46 (see FIG. 10) on the outer end portions of the air flow conditioning members 41 to 44 in the vehicle width direction. For example, the planes 48 in the outer end portions of the air flow conditioning members 41 to 44 in the vehicle width direction may be provided as other members such as resin members or the like are press-fitted into the concave sections 46 (see FIG. 10) formed in the outer end portions of the air flow conditioning members 41 to 44 in the vehicle width direction. For example, the planes 48 in the outer end portions of the air flow conditioning members 41 to 44 in the vehicle width direction may be provided by the concave sections 46 (see FIG. 10) formed in the outer end portions of the air flow conditioning members 41 to 44 in the vehicle width direction being filled with a material such as a resin or the like.

While the example in which the fourth wing 44 abuts the inner surface 32a of the outer cowl 32 in the vehicle width direction has been exemplarily described in the embodiment, there is no limitation thereto. For example, the fourth wing 44 may be separated from the inner surface 32a of the outer cowl 32 in the vehicle width direction.

While the case in which all of the outer end portions of the first wing 41, the second wing 42 and the third wing 43 in the vehicle width direction are separated from the inner surfaces 32a of the outer cowls 32 in the vehicle width direction has been described in the embodiment, there is no limitation thereto. For example, part of the outer end portions of the first wing 41, the second wing 42 and the third wing 43 in the vehicle width direction may abut the inner surfaces 32a of the outer cowls 32 in the vehicle width direction. That is, at least some of the outer end portions of the wings 41 to 44 in the vehicle width direction may be separated from the inner surfaces 32a of the outer cowls 32 in the vehicle width direction.

Figure 14:
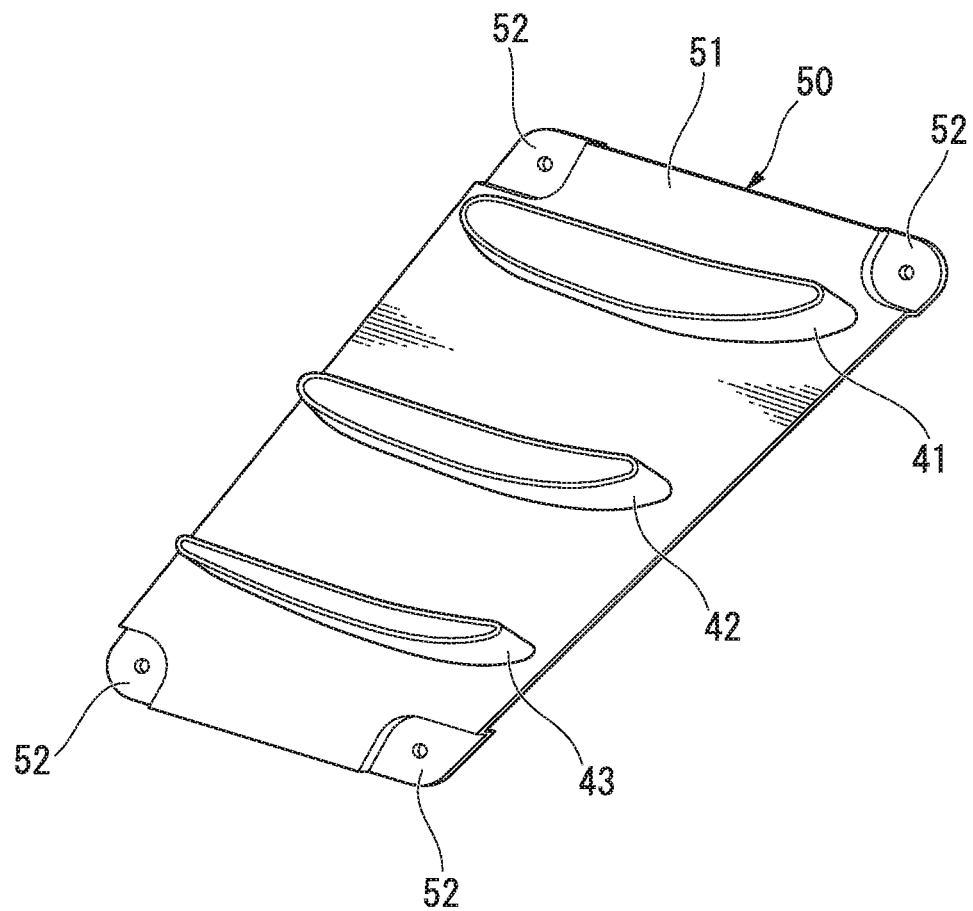
FIG. 14 is a right side view of the air flow conditioning unit according to the variant of the embodiment.

While the example in which the four wings 41 to 44 are provided has been exemplarily described in the embodiment, there is no limitation thereto. For example, as shown in FIG. 14, three wings 41 to 43 may be provided. For example, while not shown, only one wing may be provided, or two or five or more wings may be provided.

While the example in which the connecting member 50 and the inner cowls 31 are fastened by bolts (see FIG. 8) has been exemplarily described in the embodiment, there is no limitation thereto. For example, the connecting member 50 and the inner cowls 31 may be fixed using a fixing member such as a rivet or the like, or may be adhered using an adhesive agent.

While the case in which the air flow conditioning members 41 to 44 have an upward shape inclined so as to be disposed upward as it goes rearward when seen in a side view has been described as an example in the embodiment, there is no limitation thereto. For example, a configuration in which angles of the air flow conditioning members 41 to 44 can be adjusted may be provided. That is, postures of the air flow conditioning members 41 to 44 may be adjusted between a state in which the air flow conditioning members 41 to 44 are inclined so as to be disposed upward as it goes rearward and a horizontal state when seen in a side view. Accordingly, an effect of downforce can be adjusted according to required specification.

While the example in which the air flow conditioning members 41 to 44 are formed integrally with the connecting member 50 has been exemplarily described in the embodiment, there is no limitation thereto. For example, the air flow conditioning members 41 to 44 may be provided separately from the connecting member 50.

While the example in which the fork cover section 15a is a portion of the front fender 15 configured to cover the exposure section of the inner tube 14a of the front fork 14 from a front side (see FIG. 11) has been exemplarily described in the embodiment, there is no limitation thereto.

For example, the fork cover section 15a may be a portion of the front fender 15 configured to cover the entire lower section of the front fork 14 from a front side. That is, the fork cover section 15a may be a portion of the front fender 15 configured to cover at least a part of the front fork 14.

While the case in which the fork cover section 15a covers a part of the front fork 14 from a front side (see FIG. 11) has been exemplarily described in the embodiment, there is no limitation thereto. For example, the fork cover section 15a may cover a part of the front fork 14 from the outside in the vehicle width direction. That is, the fork cover section 15a may cover a part of the front fork 14 at least from one of a front side and lateral side.

Further, the present invention is not limited to the embodiment, for example, all vehicles on which a driver rides on the vehicle body are included as the saddle riding vehicle, and in addition to a motorcycle (including a motorized bicycle and a scooter-type vehicle), a three-wheeled vehicle (including a two-front-wheeled and one-rear-wheeled vehicle in addition to one-front-wheeled and two-rear-wheeled vehicle) may also be included. In addition, the present invention can be applied not only to a motorcycle but also to a four-wheeled vehicle such as an automobile or the like.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A saddle riding vehicle comprising side cowls configured to cover at least a part of a vehicle body from sides, wherein each of the side cowls comprises:
an inner cowl;
an outer cowl configured to cover the inner cowl from an outside in a vehicle width direction to form an air guide path configured to guide traveling air from a front side to a rear side between the inner cowl and the outer cowl; and
an air flow conditioning member configured to generate downforce using traveling air directed from the inner cowl to an inner surface of the outer cowl in the vehicle width direction and flowing through the air guide path, and
the air flow conditioning member is separated from the inner surface of the outer cowl in the vehicle width direction, and
an outer end portion of the air flow conditioning member in the vehicle width direction has a concave section recessed inward in the vehicle width direction.

2. The saddle riding vehicle according to claim 1, wherein a communication space configured to communicate with the outside in the vehicle width direction of the air flow conditioning member in an upward/downward direction is formed between the inner cowl and the outer cowl.

3. The saddle riding vehicle according to claim 1, wherein a front edge of the air flow conditioning member is inclined so as to be disposed forward as it goes inward in the vehicle width direction.

4. The saddle riding vehicle according to claim 1, wherein an outer end portion of the air flow conditioning member in the vehicle width direction has a plane facing the inner surface of the outer cowl in the vehicle width direction.

5. The saddle riding vehicle according to claim 1, wherein a plurality of air flow conditioning members are provided at intervals in the upward/downward direction, and
a connecting member configured to connect inner ends of the plurality of air flow conditioning members in the vehicle width direction is further provided.

6. The saddle riding vehicle according to claim 5, wherein the plurality of air flow conditioning members and the connecting member are formed integrally with a same member.

7. The saddle riding vehicle according to claim 1, wherein a through-hole that opens in the vehicle width direction and through which the air flow conditioning member is able to pass is formed in the inner cowl, and
the air flow conditioning members are attached to an inner surface of the inner cowl in the vehicle width direction so as to be directed toward the inner surface of the outer cowl in the vehicle width direction through the through-hole.

8. The saddle riding vehicle according to claim 1, wherein a plurality of air flow conditioning members are provided at intervals in the upward/downward direction,
the plurality of air flow conditioning members comprise:
a first air flow conditioning member; and
a second air flow conditioning member disposed below the first air flow conditioning member, and
the first air flow conditioning member is larger than the second air flow conditioning member.

9. The saddle riding vehicle according to claim 1, wherein a plurality of air flow conditioning members are provided at intervals in the upward/downward direction,
the plurality of air flow conditioning members comprise:
a first air flow conditioning member; and
a second air flow conditioning member disposed below the first air flow conditioning member, and
a closing section configured to close a space below the second air flow conditioning member from a front side is formed on each of the side cowls.

10. The saddle riding vehicle according to claim 8, wherein an upper surface of the second air flow conditioning member extends to be inclined so as to be disposed upward as it goes rearward when seen in a side view.

11. The saddle riding vehicle according to claim 8, further comprising a front fender configured to cover a front wheel from above,
wherein the front fender comprises a fork cover section configured to cover at least a part of a front fork at least from one of a front side and a lateral side, and
the fork cover section is disposed below a front end of an upper surface of the second air flow conditioning member.

12. The saddle riding vehicle according to claim 1, further comprising a handle grip that is able to be gripped by an occupant,
wherein an upper surface of the air flow conditioning member extends to be inclined so as to be disposed upward as it goes rearward when seen in a side view, and
an outer end of the handle grip in the vehicle width direction is disposed above an extension line of the upper surface of the air flow conditioning member when seen in a side view.

* * * * *